(12) United States Patent
Soled et al.

(10) Patent No.: US 7,686,943 B2
(45) Date of Patent: Mar. 30, 2010

(54) HYDROPROCESSING USING HYDROTHERMALLY-PREPARED BULK MULTIMETALLIC CATALYSTS

(75) Inventors: Stuart L. Soled, Pittstown, NJ (US); Sabato Miseo, Pittstown, NJ (US); Sonja Eijsbouts, Nieuwkuijk (NL); Frans L. Plantenga, Hoevelaken (NL)

(73) Assignee: ExxonMobil Research and Engineering Company, Annandale, NJ (US)

( * ) Notice: Subject to any disclaimer, the term of this patent is extended or adjusted under 35 U.S.C. 154(b) by 576 days.

(21) Appl. No.: 11/586,397

(22) Filed: Oct. 25, 2006

(65) Prior Publication Data

US 2007/0090023 A1    Apr. 26, 2007

Related U.S. Application Data

(60) Provisional application No. 60/730,257, filed on Oct. 26, 2005.

(51) Int. Cl.
*C10G 11/02* (2006.01)
*C10G 45/04* (2006.01)

(52) U.S. Cl. .............. 208/113; 208/120.2; 208/119; 208/120.3; 208/120.35; 208/216 R; 208/217; 208/243; 208/244; 208/254 H; 208/251 R

(58) Field of Classification Search .............. None
See application file for complete search history.

(56) References Cited

U.S. PATENT DOCUMENTS

| | | | |
|---|---|---|---|
| 6,162,350 A * | 12/2000 | Soled et al. ............ | 208/113 |
| 6,534,437 B2 * | 3/2003 | Eijsbouts et al. ........ | 502/313 |
| 6,582,590 B1 * | 6/2003 | Riley et al. ............ | 208/210 |
| 7,288,182 B1 * | 10/2007 | Soled et al. ............ | 208/112 |
| 7,557,062 B2 * | 7/2009 | Domokos et al. ........ | 502/309 |

* cited by examiner

*Primary Examiner*—Tam M Nguyen
(74) *Attorney, Agent, or Firm*—Paul Purwin; David Weisberg

(57) ABSTRACT

The invention relates to a process for upgrading hydrocarbonaceous feedstreams by hydroprocessing using bulk bimetallic catalysts. More particularly, the invention relates to a catalytic hydrotreating process for the removal of sulfur and nitrogen from a hydrocarbon feed such as a fuel or a lubricating oil feed. The catalyst is a bulk catalyst containing at leas one Group VIII metal and at least one Group VIB metal. The catalyst is prepared hydrothermally.

16 Claims, No Drawings

HYDROPROCESSING USING HYDROTHERMALLY-PREPARED BULK MULTIMETALLIC CATALYSTS

This application claims the benefit of U.S. Provisional Application No. 60/730,257 filed Oct. 26, 2005.

FIELD OF THE INVENTION

The invention relates to a process for upgrading hydrocarbonaceous feedstreams by hydroprocessing using bulk bimetallic catalysts. More particularly, the invention relates to a catalytic hydrotreating process for the removal of sulfur and nitrogen from a hydrocarbon feed such as a feed to a fuel process or a feed to a lubricating oil process. The catalyst is a bulk catalyst containing a Group VIII metal and a Group VIB metal formed by a hydrothermal process.

BACKGROUND OF THE INVENTION

Increasing regulatory and operational pressure has resulted in the need for hydrocarbons that have low sulfur levels and nitrogen levels. Hydroprocessing, which involves treating a hydrocarbon with hydrogen in the presence of a catalyst, is a conventional method for heteroatom (e.g., sulfur and nitrogen) removal.

Conventional hydroprocessing (i.e., known to those skilled in the art of hydrocarbon upgrading) catalysts generally contain a Group VIB metal with one or more Group VIII metals on a refractory support. Hydrotreating catalysts that are particularly suitable for hydrodesulfurization, as well as hydrodenitrogenation, generally contain molybdenum or tungsten on alumina promoted with a metal such as cobalt, nickel, iron, or a combination thereof. Cobalt promoted molybdenum on alumina catalysts are most widely used when the limiting specifications are hydrodesulfurization, while nickel promoted molybdenum on alumina catalysts are the most widely used for hydrodenitrogenation, partial aromatic saturation, as well as hydrodesulfurization.

PCT Publication WO 00/41810 describes bulk catalyst compositions comprising bulk catalyst particles having at least one group VIII metal and at least two group VIB metals (hereafter referred to as trimetallic bulk catalysts), in particular nickel/molybdenum/tungsten based catalysts. The trimetallic bulk catalyst particles are prepared in a process in which the metal components are combined in the presence of a protic liquid and wherein one or more metal components remains at least partly in the solid state during the entire process, i.e., a solid-solute process. The patent publication also describes in the comparative examples a bimetallic bulk catalyst comprising one Group VIII metal and only one Group VIB metals prepared with the solid-solute process.

Although WO 00/41810 describes wide ranges for the metal molar ratio, acceptable conversions are achieved only at a metal molar ratio above 1.25. As too high a metal molar ratio may add unnecessary weight and reduce the activity per unit weight of the bulk catalyst, there is a need for bulk catalysts having a high activity and a reduced metal molar ratio, i.e., a reduced amount of Group VIII promoter metal.

SUMMARY OF THE INVENTION

The invention relates to a process for hydroprocessing a hydrocarbon feed, the process comprising contacting the feed with hydrogen in the presence of a catalytically effective amount of a bulk metal catalyst under catalytic conversion conditions, the bulk metal catalyst comprising metal oxidic particles containing one or more Group VIB metals and one or more Group VIII metals, the bulk metal catalyst being made by:
 (i) combining in a reaction mixture one or more first compounds comprising one or more Group VIII metal and one or more second compounds comprising one or more Group VIB metals in the presence of a protic liquid, wherein the Group VIII metal to Group VIB metal molar ratio is between about 0.1 and about 5, and
 (ii) reacting the compounds under hydrothermal conditions to form metal oxidic particles.

It was surprisingly found that by using hydrothermal synthesis conditions, low metal molar ratios of Group VIII to Group VIB metals can be achieved in the metal oxidic particles. Such low molar metal ratios are very difficult to achieve under atmospheric conditions. Also, catalysts having improved catalytic activity were obtained, compared to catalyst obtained from synthesis mixtures having the same molar ratio of Group VIII to Group VIB metal under atmospheric conditions.

In an embodiment, the catalyst comprises at least about 60 wt. % of the metal oxidic particles. In a preferred embodiment, the bulk catalyst is a sulfided catalyst.

In an embodiment, the protic liquid is water and the hydrothermal reaction conditions include a reaction temperature above about 100° C. and a reaction pressure higher than about 1 bar. In another embodiment, the metal oxidic particles are dried and/or heat treated after synthesis at a temperature below about 375° C. Preferably, the one or more first metal compounds and the one or more second metal compounds remain at least partly in the solid state during the entire synthesis reaction.

In an embodiment, the Group VIII metal to Group VIB metal mole ratio is between about 0.2 and about 1.5, preferably between about 0.2 and about 1.0. In another embodiment, the reaction mixture comprises a Group V metal, preferably niobium.

In an embodiment, the metal oxidic particles comprise only one Group VIII metal, preferably nickel, and only two independently selected Group VIB metals, preferably tungsten and molybdenum. In another embodiment, the metal oxidic particles comprise only one Group VIII metal, preferably nickel, and only one Group VIB metal, preferably tungsten.

In an embodiment, the process further comprises forming a vapor product containing at least one of sulfur and nitrogen. In a related embodiment, the vapor product is separated from the hydrocarbon product and the vapor product is conducted away from the process.

In an embodiment, the catalytic conversion conditions are hydrotreating conditions effective for converting at least a portion of organically bound sulfur and organically bound nitrogen into hydrogen sulfide and ammonia respectively. In a related embodiment, the process further comprises at least one of (i) hydrocracking and (ii) hydrogenating the hydrocarbon feed.

In an embodiment, the hydrocarbon product is conducted away from the process for storage and/or further processing. For example, the liquid product, depending on product boiling range, is useful as (i) a fuel oil, such as a diesel oil or (ii) a lubricating oil such as a lubricating oil basestock.

DETAILED DESCRIPTION OF THE INSTANT INVENTION

The invention will be described as follows: a first section will describe catalytic hydroprocessing, a second section will describe the bulk multimetallic hydroprocessing catalyst, a third section will describe methods for making the bulk multimetallic catalyst, and a fourth section will contain examples.

Section I

Catalytic Hydroprocessing

The present invention relates to hydroprocessing a hydrocarbon feed by a process comprising contacting the feed with hydrogen in the presence of a catalytically effective amount of a bulk metal catalyst under catalytic conversion conditions. The bulk metal catalyst comprises one or more independently selected Group VIII metals and one or more independently selected Group VIB metals. In an embodiment, the Group VIB metal component is selected from molybdenum, tungsten, and mixtures thereof; and the Group VIII metal component is selected from nickel, cobalt, iron, and mixtures thereof. The metal components (calculated as oxides) and in the form of bulk metal particles make up for at least 60 wt. % of the catalyst. In an embodiment, the catalyst is not amorphous, i.e., the catalyst exhibits at least some crystallinity as evidenced by X-Ray diffraction, for example.

It has been discovered that such a catalyst is effective for the removal of nitrogen and sulfur from a hydrocarbon feed, and is particularly effective for hydroprocessing feeds containing both nitrogen and sulfur. The contacting of the hydrocarbonaceous feedstream with the bulk metal hydroprocessing catalyst occurs in the presence of a hydrogen-containing treat gas, and the reaction stage is operated under effective hydroprocessing conditions. The contacting of the hydrocarbonaceous feedstream with the bulk metal hydroprocessing catalyst produces at least a liquid hydrocarbon product having less nitrogen, sulfur, or both compared to the feed.

The hydrocarbon feed is a material comprising hydrogen and carbon that is obtained or derived from crude petroleum oil, from tar sands, from coal liquefaction, shale oil and hydrocarbon synthesis. Hydrocarbon feeds include feeds boiling from the naphtha boiling range to heavy feedstocks, such as gas oils and resids, and also those derived from Fischer-Tropsch processes. Typically, the feed boiling range will be from about 40° C. to about 1000° C. Non-limiting examples of suitable feedstreams include vacuum gas oils; distillates including naphtha, diesel, kerosene, and jet fuel; heavy gas oils, raffinates, lube oils, cycle oils, waxy oils, and the like.

Hydrocarbon feeds generally contain contaminants such as nitrogen and sulfur, often in organically-bound form. Feed nitrogen content can range from about 50 wppm to about 5000 wppm nitrogen, based on the weight of the feed, or about 75 wppm to about 800 wppm nitrogen, or about 100 wppm to about 700 wppm nitrogen. The nitrogen appears as both basic and non-basic nitrogen species. Examples of basic nitrogen species include quinolines and substituted quinolines, and examples of non-basic nitrogen species may include carbazoles and substituted carbazoles.

Feed sulfur content generally ranges from about 50 wppm to about 5 wppm, based on the weight of the feed, or from about 100 wppm to about 5000 wppm, or from about 100 wppm to about 3000 wppm. Feeds subjected to prior processing such as separation, extraction, hydroprocessing, etc., may have significantly less sulfur, for example in the range of 75 wppm to 500 wppm. Feed sulfur will usually be present as organically bound sulfur. That is, as sulfur compounds such as simple aliphatic, naphthenic, and aromatic mercaptans, sulfides, di- and polysulfides and the like. Other organically bound sulfur compounds include the class of heterocyclic sulfur compounds such as thiophene, tetrahydrothiophene, benzothiophene and their higher homologs and analogs. The feed can also contain olefinic and aromatic hydrocarbon, with aromatics being typically present in an amount ranging from about 0.05 wt. %, to about 50 wt. %, based on the weight of the feed.

In an embodiment, the invention relates to contacting the feed with hydrogen in the presence of the catalyst under catalytic hydroprocessing conditions. The hydrogen may be in the form of a hydrogen-containing treat gas. The term "hydroprocessing" means a catalytic process conducted in the presence of hydrogen. The term includes processes such as the hydroconversion of heavy petroleum feedstocks to lower boiling products; the hydrocracking of distillate boiling range feedstocks; the hydrotreating of various petroleum feedstocks to remove heteroatoms, such as sulfur, nitrogen, and oxygen; the hydrogenation of unsaturated hydrocarbon; the hydroisomerization and/or catalytic dewaxing of waxes, particularly Fischer-Tropsch waxes; demetallation of heavy hydrocarbons, and ring-opening. Thus, "effective hydroprocessing conditions" are to be considered those conditions that when selected achieve the desired result of the hydroprocessing process. For example, effective hydroisomerization and/or catalytic dewaxing conditions are to be considered those conditions that, when selected, achieve the desired degree of dewaxing to produce the desired product.

In a preferred embodiment, the effective hydroprocessing conditions are effective hydrotreating conditions, i.e., conditions effective for at least one of (i) hydrogenation or (ii) hydrogenolysis. Generally, hydrotreating conditions will result in removing at least a portion of the heteroatoms in the feed and in hydrogenating at least a portion of the aromatics in the feed. Hydrotreating conditions typically include temperatures ranging from about 100° C. to about 450° C., preferably about 200° C. to about 370° C., more preferably about 230° C. to about 350° C. Typical weight hourly space velocities ("WHSV") range from about 0.05 to about 20 hr$^{-1}$, preferably from about 0.5 to about 5 hr$^{-1}$. Any effective pressure can be utilized, and pressures typically range from about 5 to about 250 bar. Hydrogen ($H_2$) to oil ratio generally ranges from about 5 to about 2000 NL/L. Process conditions may vary, as is known to those skilled in the art, depending on the feed boiling range and speciation. Generally, as the boiling point of the feed increases, the severity of the conditions will also increase. The following table serves to illustrate typical conditions for a range of feeds.

| FEED | TYPICAL BOILING RANGE ° C. | TEMP. ° C. | PRESS, BAR | SPACE VELOCITY V/V/HR | $H_2$ GAS RATE SCF/B |
|---|---|---|---|---|---|
| Naphtha | 25-210 | 100-370 | 10-60 | 0.5-10 | 100-2,000 |
| Diesel | 170-350 | 200-400 | 15-110 | 0.5-4 | 500-6,000 |

-continued

| FEED | TYPICAL BOILING RANGE °C. | TEMP. °C. | PRESS, BAR | SPACE VELOCITY V/V/HR | $H_2$ GAS RATE SCF/B |
|---|---|---|---|---|---|
| Heavy Gas Oil | 325-475 | 260-430 | 15-170 | 0.3-2 | 1000-6,000 |
| Lube Oil | 290-550 | 200-450 | 6-210 | 0.2-5 | 100-10,000 |
| Resid | 10-50% > 575 | 340-450 | 65-1100 | 0.1-1 | 2,000-10,000 |

The process uses hydrogen or a hydrogen-containing treat gas. Treat gas can comprise substantially pure hydrogen or can be mixtures of other components typically found in refinery hydrogen streams. It is preferred that the treat gas contain little, more preferably no, hydrogen sulfide. The treat gas purity should be at least about 50% by volume hydrogen, preferably at least about 75% by volume hydrogen, and more preferably at least about 90% by volume hydrogen. The treat gas can be pure or substantially pure hydrogen.

The hydroprocessing occurs in a reaction stage. The reaction stage can comprise one or more reactors or reaction zones each of which comprises one or more catalyst beds of the same or different catalyst. At least one bed will contain the bulk metal catalyst of the present invention. Although other types of catalyst beds/reactors can be used, fixed beds are preferred. Such other types of catalyst beds include fluidized beds, ebullating beds, slurry beds, and moving beds. Interstage cooling or heating between reactors, reaction zones, or between catalyst beds in the same reactor, can be employed. A portion of the heat generated during hydroprocessing can be recovered. Where this heat recovery option is not available, conventional cooling may be performed through cooling utilities such as cooling water or air, or through use of a hydrogen quench stream. In this manner, optimum reaction temperatures can be more easily maintained.

Section II

Bulk Multimetallic Catalysts

The bulk catalyst contains at least one Group VIII metal and at least one Group VIB metal. The Group VIII to Group VIB metal molar ratio for the catalyst can vary widely, for example between about 0.1 and about 5. Generally good results can be obtained with a metal molar ratio between about 0.2 and about 4. In this range two different sub-ranges were distinguished. In the metal molar ratio range between about 0.2 and about 1 it was more difficult to obtain a good catalyst when the first and second metal compounds were reacted under atmospheric pressure conditions, i.e., at or near atmospheric pressure. Good and better in this context mean: a bulk catalyst with high or higher hydrodesulfurization or hydrodenitrogenation activity than a conventional catalyst.

When the bulk metal catalyst was prepared under atmospheric conditions from a synthesis mixture containing a Group VIII metal to Group VIB metal molar ratio range of about 0.2 to about 1, the X-ray diffraction ("XRD") pattern sometimes showed a large number of unidentifiable peaks, possibly also of unreacted starting materials. A catalyst having such XRD pattern was found to be inactive. It was surprisingly found that, when the bulk metal catalyst is prepared under hydrothermal conditions from a synthesis mixture containing a Group VIII metal to Group VIB metal mole ratio between about 0.2 and about 1, a good bulk catalyst could nevertheless be obtained.

Preferably, the bulk metal catalyst is prepared from synthesis mixtures containing Group VIII to Group VIB metal mole ratios of more than about 0.3, preferably more than about 0.4, more preferably more than about 0.5, even more preferably more than about 0.6 and most preferably more than about 0.7.

When the metal molar ratio of Group VIII to Group VIB metal in the synthesis mixture is above about 1, an active catalyst can be prepared under atmospheric reaction conditions. However also in this metal molar ratio range hydrothermal conditions produce bulk catalyst having a higher activity than bulk catalysts prepared under atmospheric conditions from synthesis mixtures with the same Group VIII to Group VIB molar ratio. The bulk catalyst prepared under hydrothermal conditions preferably has an increase in hydrodesulfurization activity, compared to a catalyst with the same composition but produced under atmospheric conditions, of at least about 10%, preferably at least about 15%, more preferably at least about 20%, even more preferably at least about 25% and most preferably at least about 30% (the hydrodesulfurization activity as determined in the standard test described below in the description of the examples according to the invention). In the alternative, the bulk catalyst prepared under hydrothermal conditions has, at the same hydrodesulfurization activity level as a bulk metal catalyst prepared under atmospheric conditions, a Group VIII to Group VIB metal molar ratio decreased with at least about 10%, more preferably at least about 15%, even more preferably at least about 20% and most preferably at least about 25%.

Preferably, the bulk catalyst comprises metal oxidic particles comprising only one Group VIII metal, preferably cobalt or nickel, and only two Group VIB metals, preferably tungsten and molybdenum. In another preferred embodiment, the bulk catalyst comprises metal oxidic particles comprising only one Group VIII metal, preferably nickel, and only one Group VIB metal, preferably tungsten.

In an alternative embodiment, the bulk catalyst according to the invention comprises a Group V metal, preferably niobium. It was found that a significant activity improvement could be obtained even with relatively small amounts of Group V metal between about 0.1 and about 10 wt. %, preferably between about 0.1 and about 7 wt. % and more preferably between about 0.1 and about 5 wt. %. In yet an alternative embodiment, the bulk catalyst according to the invention comprises a Group V metal, preferably niobium in an amount of at least about 0.1 mole % and of less than about 10 mole %, preferably less than 8 mole %, conveniently less than 7 mole %, such as less than 5 mole %.

Preferred bulk metal catalysts have a metastable hexagonal structure. This metastable hexagonal structure has, in case the group VIB metal is tungsten, an X-ray diffraction pattern with a reflection between about 60° and 65°2θ (diffraction angle 2 theta) and main reflections between about 32° and about 36°2θ and between about 50° and about 55°2θ. When the Group VIB metal is molybdenum, the X-ray diffraction pattern shows two reasonably well-resolved reflections, one between about 29° and about 31°2θ, the other between about 59° and about 61°2θ. While not wishing to be bound by any model or theory, the presence of the metastable hexagonal phase appeared to be indicative of a high catalytic activity of the oxidic bulk catalyst, although there is no strict quantitative relation found. It is preferred that reflections of other crystalline compounds are substantially absent in the X-ray diffraction pattern, although an amorphous phase may be present. However, it was found that catalysts having good catalytic activity typically have X-ray diffraction peaks with a full width at half maximum (FWHM) below 2.5.

The bulk metal catalysts are sensitive to heat treatment. Consequently, the bulk metal catalyst should be heat treated at a temperature below a temperature where transition to a fully-crystalline structure occurs. This applies to any and all heat treatment steps in the production process of the bulk metal catalyst prior to use in hydroprocessing. This applies in particular also to heat treatment of shaped bulk catalyst particles after compositing and shaping. Preferably, the bulk catalyst is heat treated below about 450° C., more preferably below about 400° C., even more preferably below about 375° C. and most preferably below about 350° C.

The metal oxidic particles of the bulk metal catalyst preferably have a median particle size in the range of at least about 0.5 μm, more preferably at least about 1 μm, most preferably at least about 2 μm, but preferably not more than about 5000 μm, more preferably not more than about 1000 μm, even more preferably not more than about 500 μm, and most preferably not more than about 150 μm. Even more preferably, the median particle diameter lies in the range of about 1 to about 150 μm and most preferably in the range of about 2 to about 150 μm. Preferably, the median particle size of the metal oxidic particles remains substantially unchanged in the bulk catalyst after compositing and shaping.

The bulk catalyst comprises at least about 60 wt. % of metal oxidic particles (wt. % calculated on the basis of metal oxides relative to the total weight of the bulk catalyst) as distinguished from supported catalysts that have metal oxides deposited on a support material in amounts significantly less than about 60 wt. %. Preferably, the bulk metal catalyst comprises at least about 70 wt. %, more preferably at least about 75 wt. %, even more preferably at least about 80 wt. % and most preferably at least about 85 wt. % metal oxidic particles, the remaining about 0 to about 40 wt. % being one or more materials selected from the group of binder materials, conventional hydroprocessing catalysts and cracking compounds. Typically, after compositing of the metal oxidic particles with a binder, the composition is shaped, preferably extruded, to form shaped bulk catalyst particles. The invention also relates to shaped bulk catalyst particles comprising the metal oxidic particles. Accordingly, in one embodiment, the bulk catalyst is in the form of shaped particles, for example produced by extrusion of a composition comprising the metal oxidic particles and about 0 to about 40 wt. % (relative to the total weight of the bulk catalyst) of an additional material, in particular a binder material. A bulk catalyst is distinguished from a supported catalyst in that it does not comprise a preformed carrier material. The metal oxides are not deposited on the preformed carrier material, but are present as metal oxidic particles in a shaped catalyst. The nickel tungsten bulk catalyst is most preferably bimetallic, that is substantially having only tungsten as the Group VIB metal and preferably also having only nickel as the Group VIII metal.

In an embodiment, the bulk catalyst, preferably after compositing and shaping, has a B.E.T. surface area of at least about 10 m²/g, more preferably of at least about 50 m²/g, and most preferably of at least about 80 m²/g, as measured via the B.E.T. method. The median pore diameter (50% of the pore volume is below said diameter, the other about 50% above it) of the metal oxidic particles preferably is about 3 to about 25 nm, more preferably about 5 to about 15 nm (determined by $N_2$ adsorption). The total pore volume of the metal oxidic particles preferably is at least about 0.05 ml/g and more preferably at least about 0.1 ml/g, as determined by $N_2$ adsorption.

In an embodiment, the pore size distribution of the bulk catalyst, preferably after compositing and shaping, is approximately the same as that of conventional hydroprocessing catalysts. More in particular, the metal oxidic particles preferably have a median pore diameter of about 3 to about 25 nm, as determined by nitrogen adsorption, a pore volume of about 0.05 to about 5 ml/g, more preferably of about 0.1 to about 4 ml/g, still more preferably of about 0.1 to about 3 ml/g, and most preferably of about 0.1 to about 2 ml/g, as determined by nitrogen adsorption.

Generally, the bulk catalyst after compositing and shaping has a mechanical strength, expressed as side crush strength (SCS), of at least 1 lbs/mm and preferably of at least about 3 lbs/mm (measured on extrudates with a diameter of about 1 to 2 about mm). The SCS of the bulk catalyst can be adequately increased by compositing the metal oxidic particles with a sufficient amount of binder.

To obtain catalyst compositions with high mechanical strength, it may be desirable for the catalyst composition to have a low macroporosity. Preferably, less than about 30% of the pore volume of the catalyst composition is in pores with a diameter higher than about 100 nm (determined by mercury intrusion, contact angle: about 130°), more preferably less than about 20%.

The invention also relates to a sulfided bulk catalyst comprising a bulk catalyst according to the invention which has been sulfided. Generally, the median particle diameters of the metal sulfidic particles in the sulfided bulk catalyst are identical to those given above for the metal oxidic particles.

Section III

Making Bulk Multimetallic Catalysts

The invention also relates to a process for the manufacture of a bulk metal catalyst comprising metal oxidic particles containing one or more Group VIB metals and one or more Group VIII metals, the bulk metal catalyst being made by:
(i) combining in a reaction mixture one or more first compounds comprising one or more Group VIII metal and one or more second compounds comprising one or more Group VIB metals in the presence of a protic liquid, wherein the Group VIII metal to Group VIB metal molar ratio is between about 0.1 and about 5, and
(ii) reacting the compounds under hydrothermal conditions to form metal oxidic particles.

The process further optionally comprising one or more of the following process steps:
(iii) separating the metal oxidic particles from the reaction mixture,
(iv) compositing the metal oxidic particles with 0.1 to 40 wt. % of one or more materials selected from the group of binder materials, conventional hydroprocessing catalysts, cracking compounds, acidic additives or mixtures thereof before, during or after the combining and/or reacting of the metal compounds, (v) spray-drying, (flash) drying, milling, kneading, slurry-mixing, dry or wet mixing, or combinations thereof,
(vi) shaping,
(vii) drying and/or thermally treating, and
(viii) sulfiding.

The catalyst preparation steps will now be described in more detail.

Step (i)

The protic liquid used to make the catalyst can be any protic liquid. Representative examples include water, carboxylic acids, and alcohols such as methanol, ethanol, and mixtures thereof. Preferably the protic liquid comprises water, such as mixtures of an alcohol and water, and more preferably water. Also, independently selected protic liquids can be used. For instance, a suspension or solution of a metal compound in ethanol can be added to an aqueous suspension/solution of another metal compound. In an embodiment, the protic liquid is chosen which does not appreciably interfere with the reaction.

In an embodiment, both the first and second metal compounds remain at least partly in the solid state during the entire reaction (the solid-solid process). When the protic liquid is water, the solubility of the Group VIII metal compounds and Group VIB metal compounds which are at least partly in the solid state during the process generally is less than about 0.05 mol/(100 ml water at 18° C.). When the protic liquid is water, suitable nickel compounds which are at least partly in the solid state during the reaction comprise, and more preferably consist essentially of, oxalates, citrates, carbonates, hydroxy-carbonates, hydroxides, molybdates, phosphates, tungstates, oxides, and mixtures thereof. Nickel hydroxy-carbonate, nickel hydroxide, nickel carbonate, and mixtures thereof are most preferred. Generally, the molar ratio between the hydroxy groups and the carbonate groups in the nickel hydroxy-carbonate lies in the range of about 0 to about 4, preferably about 0 to about 2, more preferably about 0 to about 1 and most preferably about 0.1 to about 0.8.

Suitable tungsten compounds which are at least partly in the solid state during the process include water-insoluble tungsten compounds, such as tungsten di- and trioxide, tungsten sulfide ($WS_2$ and $WS_3$), tungsten carbide, ortho-tungstic acid ($H_2WO_4 \cdot H_2O$), tungsten nitride, aluminium tungstate (also meta- or polytungstate), ammonium phosphotungstate, and mixtures thereof. Ortho-tungstic acid and tungsten di- and trioxide are preferred. Preferably, the reaction between the first and second metal compound is an acid/base reaction and the first or second metal compound is a basic solid and the other metal compound is an acidic solid compound.

In an embodiment, the first and second solid metal compound are substantially free from nitrogen atoms (preferably free from) and the protic liquid separated from the reacted metal oxidic particles in step iii) is re-used at least in part to form the slurry in step i). Most preferably, in this process the first metal compound is a nickel (hydroxy) carbonate and the second metal compound is tungstic oxide or acid.

For several reasons, this process is optimal for economical catalyst production. Apart from the fact that the metal compounds do not contain nitrogen atoms, also the reaction does not require addition of ammonia to the reaction mixture, as for example in WO 2004/073859, so the process is entirely free of nitrogen atoms. There is no accumulation of alien ions like ammonium and/or nitrate in the protic liquid on repeated recycling, there is no strict need for washing the obtained separated oxidic particles, less environmental hazard because of reduced loss of precious metals and there is no danger of explosions due to ammonium nitrate salt formation.

Preferably the catalyst is bimetallic, and is more preferably a nickel tungsten catalyst. Bimetallic catalysts are advantageous in several respects. Non limiting examples of such advantages include: the chemistry in the reaction step is simpler; because there is only one group VIB metal there can be no composition drift in the group VIB metals on recycling of the separated liquid after reaction; in the embodiment in which the compounds remain at least partly solid during the entire reaction, the amount of metals dissolved in the protic liquid is small and hence losses are smaller; spent bimetallic catalysts are easier to recycle to the constituent metals than the catalysts containing several Group VIII or Group VIB metals, because there is no need to separate two group VIII or two Group VIB metals, which is very difficult.

To obtain a final catalyst composition with high catalytic activity, it is preferred that the first and second solid metal compound(s) are porous metal compounds. For the first metal compound, preferably Ni hydroxy carbonate, the surface area (SA): SA>220 $m^2/g$, the pore volume pV>0.29 $cm^3/g$ (as measured by nitrogen adsorption), and the median pore diameter MPD>3.8 nm (as measured by nitrogen desorption) and for the second metal compound, preferably tungstic acid, SA>19 $m^2/g$, pV>0.04 $cm^3/g$ (as measured by nitrogen adsorption), MPD>6.1 nm (as measured by nitrogen desorption). It is desired that the total pore volume and the pore size distribution of these metal compounds are similar to those of conventional hydroprocessing catalysts. Preferably, the pore volume is about 0.05 to about 5 ml/g, preferably of about 0.05 to about 4 ml/g, more preferably of about 0.05 to about 3 ml/g, and most preferably about 0.05 to about 2 ml/g, as determined by mercury or water porosimetry. Further, the surface area preferably is at least about 10 $m^2/g$, more preferably of at least 20 $m^2/g$, and most preferably at least about 30 $m^2/g$, as determined via the B.E.T. method.

The median particle diameter of the first and second solid metal compound(s) preferably is in the range of at least about 0.5 μm, more preferably at least about 1 μm, most preferably at least 2 μm, but preferably not more than about 5000 μm, more preferably not more than about 1000 μm, even more preferably not more than about 500 μm, and most preferably not more than about 150 μm. Even more preferably, the median particle diameter lies in the range of about 1 to about 150 μm and most preferably in the range of 2 to 150 μm. Generally, the smaller the particles size of the metal compounds, the higher their reactivity. Therefore, metal compounds with particle sizes below the preferred lower limits are in principle a preferred embodiment of the present invention. However, for health, safety, and environmental reasons, the handling of such small particles requires special precautions.

The Group VIII to Group VIB metal molar ratio used in the synthesis can vary widely, for example between about 0.1 and about 5. Generally good results can be obtained with a Group VIII to Group VIB metal molar ratio between about 0.2 and about 4. Preferably, the bulk metal catalyst is prepared from synthesis mixtures containing Group VIII to Group VIB metal mole ratios of more than about 0.3, preferably more than about 0.4, more preferably more than about 0.5, even more preferably more than about 0.6 and most preferably more than about 0.7. Too high Group VIII to Group VIB metal molar ratios are however not preferred because that may result in incomplete reaction of the nickel compound. Therefore it is preferred that in the bulk catalyst the Group VIII to Group VIB metal mole ratio is below about 2, preferably below about 1.5.

Step (ii)

The reaction mixture is submitted to hydrothermal conditions. In the context of the present invention, hydrothermal conditions are conditions under which the reaction mixture is heated to a temperature above the atmospheric boiling point of the protic liquid used in the reaction mixture. Typically, this is achieved in a sealed reaction vessel, under autogenous pressure, that is without applying external pressure. Given the synthesis conditions, autogenous pressures are typically above atmospheric pressure, i.e. above 1 bar.

When the protic liquid is water, the reaction is done under hydrothermal conditions at a reaction temperature above about 100° C. and a pressure higher than about 1 bar. The reaction is preferably done in an autoclave under autogenic pressure and temperatures between about 105° C. and about 180° C., such as between about 110° C. and about 170° C., more preferably between about 120° C. and about 160° C., even more preferably between about 140 and about 160° C. In an embodiment, the reaction mixture can be heated with microwave radiation.

The reaction time is chosen sufficiently long to substantially complete the reaction. The reaction is complete when the X-ray diffraction pattern of the separated metal oxidic particles does not show reflections of the unreacted starting compounds. Typically, the reaction is carried out for a time of at least about 2 hours, preferably at least about 4 hours, more preferably at least about 6 hours and most preferably at least about 8 hours.

For example, in an embodiment where the bulk catalyst is a bimetallic NiW catalyst, the catalyst has a metastable hexagonal structure having an X-ray diffraction pattern with a single reflection between about 600 and about 65°2θ (diffraction angle 2θ) and main reflections between about 32° and about 36°2θ and between about 500 and about 55°2θ (using a copper anode). The X-ray powder diffraction pattern shows a close packed hexagonal (cph) oxygen lattice with almost random distribution of nickel and tungsten over the octahedral cavities of the oxygen lattice wherein the a and b axes have a length conforming to the distance between two neighboring oxygen atoms in the same lattice in the cph structure and wherein the c axis has a length twice the distance between two successive layers in the cph structure. It is preferred that reflections of other crystalline compounds are substantially absent in the X-ray diffraction pattern, although an amorphous phase may also be present. While not wishing to be bound by any theory or model, the presence of the metastable hexagonal phase appears to be indicative of a high catalytic activity of the oxidic bulk catalyst. The crystalline structure of the metastable hexagonal $NiWO_4$ phase in the bulk catalysts have lattice parameters of a=2.92 Å, b=2.93 Å, and c=4.64 Å, all being +/−0.02 Å.

At high temperature, the hexagonal phase is transformed into "regular" orthorhombic $NiWO_4$, which can be identified by comparison with the standard powder diffraction database: JCPDS-ICDD PDF card 15-0755 or 72-1189 or 72-0480, where it is listed as "nickel tungstate oxide". The X-ray diffraction pattern of the bulk bimetallic catalyst prepared in accordance with the invention is generally similar to the X-ray diffraction pattern of the prior art trimetallic Ni/Mo/W bulk catalyst described in WO 00/41810, with the difference that the prior art diffraction pattern shows two peaks (doublet Q) between about 60° and 65°θ and, the metastable hexagonal phase structure of the nickel tungsten catalyst of the invention shows a single reflection at about 63° to about 64°.

Similarly for NiMo bulk catalysts, the instant catalyst has a high activity that is associated with the presence of the metastable hexagonal phase with main reflections having a full width half maximum [FWHM] of less than 2.5°, as opposed to conventional bulk NiMo catalysts, which are amorphous.

Generally, the reaction mixture is kept at its natural pH during the reaction step. Although not required, basic material may be added to increase the pH, as described in WO 2004/073859, where an ammonium compound is added. The pH preferably is in the range of about 0 to about 12, more preferably in the range of about 3 to about 9, and even more preferably in the range of about 5 to about 8. The amount of protic liquid is not critical but, on the one hand, is conveniently chosen sufficiently high to get a slurry that can be stirred, and, on the other hand, is conveniently chosen sufficiently low to avoid the unnecessary creation of waste liquid.

The parameters that are important for the performance of the bulk catalyst according to the invention, in particular the reaction temperature and pressure, the metal molar ratio, the hydrothermal reaction conditions and the reaction time are described above in more detail in the description of the bulk catalyst.

Step (iii)

After the reaction step, if necessary, the obtained metal oxidic particles can be separated from the liquid, e.g., via filtration or spray drying. In one alternative embodiment, such a small amount of protic liquid is used that no liquid needs to be separated from the solid reaction product. The wet reaction product can directly be shaped after optional compositing with additional material as defined below and then dried. For the separation of the metal oxidic particles in principle any solid-liquid separation technique can be used. The separation can be done before or after being composited with additional materials. After solid-liquid separation, optionally, a washing step can be included. Further, it is possible to thermally treat the bulk catalyst after an optional solid-liquid separation and drying step and prior to its being composited with the additional material.

Step (iv)

If so desired, an additional material selected from the group of binder materials, conventional hydroprocessing catalysts, cracking compounds, or mixtures thereof can be added during the above-described preparation of the metal oxidic particles or to the metal oxidic particles after their preparation. Preferably, this additional material is added to the slurry after the preparation of the metal oxidic particles and prior to the separation step, but in any case prior to the shaping step. It is mostly added after the separation from the liquid in the mixing/kneading step. Examples of other additional materials that can be composited with the metal oxidic particles in the catalyst according to the invention are described in WO 00/41810.

In all the above-described process alternatives, the term "compositing the bulk catalyst with a material" means that the material is added to the bulk catalyst or vice versa and the resulting composition is mixed. Mixing is preferably done in the presence of a liquid ("wet mixing"). This improves the mechanical strength of the final catalyst composition.

Compositing the metal oxidic particles with said additional material and/or incorporating the material during the preparation of the metal oxidic particles leads to bulk catalysts of particularly high mechanical strength, in particular if the median particle size of the metal oxidic particles is in the range of at least about 0.5 μm, more preferably at least 1 μm, most preferably at least about 2 μm, but preferably not more than about 5000 μm, more preferably not more than about 1000 μm, even more preferably not more than 500 μm, and most preferably not more than about 150 μm. Even more preferably, the median particle diameter lies in the range of about 1 to about 150 µm and most preferably in the range of about 2 to about 150 µm.

The compositing of the metal oxidic particles with the material results in metal oxidic particles embedded in this material or vice versa. Normally, the morphology of the metal oxidic particles is essentially maintained in the resulting bulk catalyst.

The binder materials to be applied may be any materials conventionally applied as binders in hydroprocessing catalysts. Examples are silica, silica-alumina, such as conventional silica-alumina, silica-coated alumina and alumina-coated silica, alumina such as (pseudo)boehmite, or gibbsite, titania, titania-coated alumina, zirconia, cationic clays or anionic clays such as saponite, bentonite, kaolin, sepiolite or hydrotalcite, or mixtures thereof. Preferred binders are silica, silica-alumina, alumina, titania, titania-coated alumina, zirconia, bentonite, or mixtures thereof. These binders may be applied as such or after peptization.

Step (v)

The slurry, optionally comprising any of the above additional materials can be subjected to spray-drying, (flash) drying, milling, kneading, slurry-mixing, dry or wet mixing, or combinations thereof, with a combination of wet mixing and kneading or slurry mixing and spray-drying being preferred. These techniques can be applied either before or after any of the above (further) materials are added (if at all), after solid-liquid separation, before or after a thermal treatment, and subsequent to re-wetting.

Step (vi)

If so desired, the metal oxidic particle optionally mixed with any of the above additional materials may be shaped optionally after step (ii) having been applied. Shaping comprises extrusion, pelletizing, beading and/or spray-drying. Any additives which are conventionally used to facilitate shaping can be added. These additives may comprise aluminium stearate, surfactants, graphite, starch, methyl cellulose, bentonite, polyethylene glycols, polyethylene oxides, or mixtures thereof. If the shaping comprises extrusion, beading and/or spray-drying, it is preferred that the shaping step is carried out in the presence of a liquid, such as water. Preferably, for extrusion and/or beading, the amount of liquid in the shaping mixture, expressed as loss of ignition (LOI), is in the range of about 20 to about 80%.

The bulk metal hydroprocessing catalysts used in the present invention can be formed into many different shapes. Non-limiting examples of suitable shapes include powders, spheres, cylinders, rings, and symmetric or asymmetric poly-lobes, for instance tri- and quadrulobes. Particles resulting from extrusion, beading or pelleting usually have a diameter in the range of about 0.2 to about 10 mm, and their length likewise is in the range of about 0.5 to about 20 mm. These particles are generally preferred. Powders, including those resulting from, e.g., spray-drying generally have a median particle diameter in the range of about 1 µm to about 100 µm, but deviations from this general range are possible.

Step (vii)

After an optional drying step, preferably above about 100° C., the resulting shaped catalyst composition may be thermally treated if desired. A thermal treatment, however, is not essential to the process. As described above, a bulk catalyst having a temperature sensitive metastable hexagonal phase which readily transforms to a crystalline structure, are preferably heat treated at a temperature below a temperature where such transition to a fully crystalline structure occurs (i.e., not a desired phase such as the hexagonal close packed phase), preferably below about 450° C., more preferably below about 400° C., even more preferably below 375° C., most preferably even below about 350° C. This thermal treatment is typically done on the final bulk catalysts after compositing and shaping. The heat treating time can vary from about 0.5 to about 48 hours and is done in an inert gas such as nitrogen, or in an oxygen-containing gas, such as air or pure oxygen. The thermal treatment can be carried out in the presence of water steam.

Step (viii)

The process of the present invention may further comprise a sulfidation step. Sulfidation is generally carried out by contacting the bulk catalyst, directly after the preparation of the metal oxidic particles or after any one of the further process steps (iii) to (vii), most preferably after the shaping to a shaped bulk catalyst, with a sulfur-containing compound such as elementary sulfur, hydrogen sulfide, DMDS, or inorganic or organic polysulfides. Catalyst sulfiding can be accomplished in any way effective for making the catalyst in sulfide form, including conventional sulfiding methods. For example, the catalyst can be contacted with one or more of the sulfur compounds, such as a sulfur-containing liquid. Such liquid may be the liquid form of a sulfur component. It may also be a solution of a sulfur compound. For elemental sulfur, it is possible to incorporate the sulfur into the catalyst via melting or sublimation. It is also possible to sulfide the product in the gaseous phase by contacting it with a sulfur-containing gas like $H_2S$. Finally, it is also possible to sulfide the catalyst by contacting it with a sulfur-containing hydrocarbon feed, e.g., a hydrocarbon feed that has been spiked with a sulfur-containing compound such as dimethyldisulfide (DMDS). Depending on the method used, sulfiding, i.e., contacting the catalyst with a sulfur-containing compound, can be carried out in situ and/or ex situ. Contacting the product with a gaseous sulfur component such as $H_2S$ can be done ex situ or in situ. Contacting the product with a sulfur-containing hydrocarbon feed is preferably done in situ. Contacting the catalyst with elemental sulfur or with a liquid or dissolved sulfur compound as described above will generally be done ex situ. In this case, it may be desired, however, to subject the sulfur-containing material to an activation step with hydrogen. The activation with hydrogen can be done ex situ or in situ. It should be noted that in the context of the present specification the indication in situ refers to a process carried out in the unit in which the catalyst will be eventually used in the hydroprocessing of hydrocarbon feeds. Conversely, ex situ refers to a process carried out not inside such unit. It is preferred that the catalyst composition is sulfided both ex situ and in situ.

A preferred process of the present invention comprises the following successive process steps of preparing the bulk catalyst according to the invention: contacting and reacting the first and second compound in a slurry with protic liquid as described above, slurry mixing the obtained oxidic metal particles with, e.g., a binder, isolating the particles via filtration, wet mixing the filter cake with a material, such as a binder, kneading, extruding, drying, calcining and sulfiding.

The catalysts are characterized using the following methods:

(A) Side Crush Strength Determination

First, the length of, e.g., an extrudate particle was measured, and then the extrudate particle was subjected to compressive loading (25 lbs in 8.6 sec.) by a movable piston. The force required to crush the particle was measured. The procedure was repeated with at least 40 extrudate particles and the average was calculated as force (lbs) per unit length (mm). The method preferably was applied to shaped particles with a length not exceeding 7 mm.

(B) Porosimetry

The $N_2$ adsorption measurement was carried out as described in: Paul A. Webb and Clyde Orr, "Analytical Methods in Fine Particle Technology", Micromeritics Instrument Corporation, Norcross, Ga., USA, 1977, ISBN 0-9656783-0-X. Where median pore diameter MPD is mentioned, we refer to the pore size distribution extracted from the desorption branch of the nitrogen sorption isotherm according to the BJH method as published: P. Barrett, L. G. Joyner, P. P. Halenda; The determination of pore volume and area distributions in porous substances. I. Computations from nitrogen isotherms, J. Am. Chem. Soc. (1951), 73, 373-380. Total surface area is determined by the BET method: S. Brunauer, P. H. Emmett and E. Teller, Adsorption of gases in multimolecular layers, J. Am. Chem. Soc. (1938), 60, 309-319.

Macropore volume determination, typically for pores having 60 nm or higher pore diameter, was carried out by mercury (Hg) porosimetry as described in e.g. Paul A. Webb and Clyde Orr, "Analytical Methods in Fine Particle Technology", Micromeritics Instrument Corporation, Norcross, Ga., USA, 1977, ISBN 0-9656783-0-X. The contact angle used was 140 degrees.

(C) Amount of Added Solid Metal Compounds (i) Qualitative Determination: The presence of solid metal compounds during the process can easily be detected by visual inspection at least if the metal compounds are present in the form of particles with a diameter larger than the wavelength of visible light. Of course, methods such as quasi-elastic light scattering (QELS) or near-forward scattering, which are known to the skilled person, can also be used to verify that at no point in time during the process all metals will be in the solute state. Median particle size was also determined with light scattering (near forward scattering).

(ii) Quantitative determination: If the metal compounds which are added at least partly in the solid state are added as suspension(s), the amount of solid metal compounds added during the process can be determined by filtration of the suspension(s) to be added under the conditions which are applied during the addition (temperature, pH, pressure, amount of liquid), in such a way that all solid material contained in the suspension(s) is collected as solid filter cake. From the weight of the solid and dried filter cake, the weight of the solid metal compounds can be determined by standard techniques. Of course, if apart from solid metal compounds further solid compounds, such as a solid binder, are present in the filter cake, the weight of this solid and dried binder must be subtracted from the weight of the solid and dried filter cake. The amount of solid metal compounds in the filter cake can also be determined by standard techniques such as atomic absorption spectroscopy (AAS), XRF, wet chemical analysis, or ICP.

If the metal compounds which are added at least partly in the solid state are added in the wetted or dry state, a filtration generally is not possible. In this case, the weight of the solid metal compounds is considered equal to the weight of the corresponding initially employed metal compounds, on a dry basis. The total weight of all metal compounds is the amount of all metal compounds initially employed, on a dry basis, calculated as metal oxides.

(D) X-Ray Characteristic Full Width at Half Maximum

The characteristic full width at half maximum (FWHM) of the oxidic catalysts was determined on the basis of the X-ray diffraction pattern of the catalyst. The characteristic full width at half maximum is the full width at half maximum (in terms of 2θ scattering angle) of the peak at 2θ=53.6° (±0.7°) and at 2θ=35° (±0.7°). For the determination of the X-ray diffraction pattern, a standard powder diffractometer (e.g., Philips PW1050) equipped with a graphite monochromator can be used. The measurement conditions can, e.g., be chosen as follows: X-ray generator settings: 40 kV and 40 mA; wavelength of 1.5418 angstroms; divergence and anti-scatter slits: v20 (variable); detector slit: 0.6 mm; step size: 0.05 (°2θ); time/step: 2 seconds. As discussed, the bulk catalyst has at least in part a hexagonal structure characterized by an X-ray diffraction pattern having a single reflection between 58 and 65° and main reflections near 35 and 53°. The main reflections in the X-ray diffraction pattern have a full width at half maximum (FWHM) of less than about 2.5.

Section IV

Examples

The invention will be further illustrated by the Examples described below. R3 means a reaction process wherein both the first and second metal compounds are at least partly solid during the reaction. R2 means a reaction route wherein either the first or second metal compound is at least partly solid during the reaction; if more than two metals are present in the synthesis mixture, the metals other than the first and second metal compounds can be either at least partly solid during the reaction or dissolved. R1 means a process wherein all metal components are dissolved in the suspension medium during the reaction. The reactions were performed under atmospheric conditions, except where HT is mentioned, meaning that catalyst synthesis was performed under hydrothermal conditions. CBD means compacted bulk density of the catalyst. The diesel hydroprocessing test results are given in Table 6 wherein RVA and RWA are relative volume activity and relative weight activity, respectively, based on the total catalyst amount loaded in the reactor. HDN is hydrodenitrogenation and HDS is hydrodesulfurization. The tests were performed using two different temperature and pressure conditions 1 and 2. The postfix 1 or 2 (for example in RWA1 and RWA2) refers to the test condition 1 and 2 respectively. The RWA HDN1 results are not shown because the nitrogen levels in the reaction product were all so low that the measurement is inaccurate and differences between the samples are too small to identify differences in catalytic activity between samples. Further, the residual nitrogen and sulfur levels after the hydrotreatment were determined and given in Table 6 under columns S1, S2 and N1. In the tests different diesel test procedures were used indicated as D1, D2 and D3. The RWA/RVA values of the reference catalysts Ref 1 and Ref 2 obtained under testing conditions D1, D2 and D3, respectively, were arbitrarily defined as 100. All other RWA/RVA values are calculated relative to these reference catalysts for each series of tests performed under the same conditions.

Reference Catalyst 1 (Ref 1: Ni1-Mo0.5-W0.5 R3 90° C.)

14.4 g of $MoO_3$ (0.1 mole Mo, ex. Aldrich) and 25.0 g of tungstic acid $H_2WO_4$ (0.1 mole W, ex. Aldrich) were slurried in 800 ml of water (suspension A) and heated to 90° C. 23.5 g of nickel hydroxycarbonate $2NiCO_3*3Ni(OH)_2*4H_2O$ (0.2 mole of Ni, ex. Aldrich) were suspended in 200 ml of water and heated to 90° C. (suspension B). The nickel hydroxycarbonate used in this and the other examples had a B.E.T. surface area of 239 $m^2/g$. Suspension B was added to suspension A in 60 minutes, and the resulting mixture was maintained at 90° C. for a period of 16 hours (overnight) with continuous stirring. At the end of this time, the suspension was filtered. The yield was above 98% (based on the calculated weight of all metal components having been converted to their oxides). The obtained filter cake was wet-mixed with 10 wt. % binder (based on the total weight of the catalyst composition). The water content of the mixture was adjusted in order to obtain an extrudable mix, and the mixture was subsequently extruded. The resulting solid was dried at 120° C. for 16 hours (overnight) and calcined at 300° C. for 1 hour. The catalyst was sulfided and tested using the procedure from Diesel test procedures D1 and D2.

Example I

Ni0.75-W1 R3 HT 150° C.

A catalyst having a Ni/W molar ratio of 0.75 to 1 was prepared in a manner analogous to what is described for Reference Catalyst 1, except that the reaction was carried out under autogenic pressure in an autoclave at a reaction temperature of 150° C. and that the reaction time was about 6 hours. 1.76 g of Ni carbonate (0.015 moles Ni) was added to 100 cc of water along with 4.99 grams of tungstic acid (0.02 mole W). The suspension was put into a sealed Weflon™ vessel of 275 cc total volume and heated at 10° C./min to 150° C. and held at that temperature for 6 hours with continuous stirring. The sample was cooled to room temperature and the solid filtered and dried overnight at 120° C. The obtained material was pelleted, the pellets were crushed and 40-60 mesh fraction was isolated by sieving. The material was then sulfided and tested using the procedure from Diesel test procedure D1.

Example II

Ni1-W1 R3 HT 150° C.

A catalyst was prepared as described as described for Reference Catalyst 1, except that only one Group VIB metal component was applied and that the reaction was carried out under autogenic pressure in an autoclave at a reaction temperature of 150° C. 2.35 g of Ni carbonate (0.02 moles Ni) was added to 100 cc of water along with 4.99 grams of tungstic acid (0.02 mole W). The suspension was put into a sealed Weflon™ vessel of 275 cc total volume and heated at 10° C./min to 150° C. and held at that temperature for 6 hours with continuous stirring. The sample was cooled to room temperature and the solid filtered and dried overnight at 120° C. The obtained material was pelleted, the pellets were crushed and 40-60 mesh fraction was isolated by sieving. The material was then sulfided and tested using the procedure from Diesel test procedure D1.

Example III

Ni0.5-W1 R3 HT 150° C.

A catalyst was prepared as described in Example II, except that the Ni/W molar ratio was 0.5 to 1. 1.17 g of Ni carbonate (0.01 moles Ni) was added to 100 cc of water along with 4.99 grams of tungstic acid (0.02 mole W). The suspension was put into a sealed Weflon™ vessel of 275 cc total volume and heated at 10° C./min to 150° C. and held at that temperature for 6 hours with continuous stirring. The sample was cooled to room temperature and the solid filtered and dried overnight at 120° C. The obtained material was wet-mixed with 10 wt. % binder, extruded, dried, calcined and sulfided as described in Reference Example Ref 1 and tested using Diesel test procedure D2.

Example IV

Ni0.5-W0.975-Nb0.025 R3 HT 150° C.

A catalyst was prepared as described in Example III, except that niobium was added and that that the Ni to W to Nb molar ratio was 0.5 to 0.975 to 0.025. 1.17 g of Ni carbonate (0.01 moles Ni) was added to 100 cc of water along with 4.87 grams of tungstic acid (0.0195 mole W) and 0.08 g of niobic acid (0.0005 moles Nb) (ex. CBBM Industries). The suspension was put into a sealed Weflon™ vessel of 275 cc total volume and heated at 10° C./min to 150° C. and held at that temperature for 6 hours with continuous stirring. The sample was cooled to room temperature and the solid filtered and dried overnight at 120° C. The obtained material was extruded (with 10 wt. % binder), dried, calcined and sulfided as described in Reference Example 1 and tested using Diesel test procedure D2.

Example V

Ni1-Mo0.5-W0.5 R3 HT 150° C.

A catalyst was prepared with Ni to Mo to W molar ratio 1 to 0.5 to 0.5. 2.35 g of Ni carbonate (0.02 moles Ni) was added to 100 cc of water along with 2.5 grams of tungstic acid (0.01 mole W) and 1.44 g of $MoO_3$ (0.01 mole Mo). The suspension was put into a sealed Weflon™ vessel of 275 cc total volume and heated at 10° C./min to 150° C. and held at that temperature under autogenic pressure for 6 hours with continuous stirring. The sample was cooled to room temperature and the solid filtered and dried overnight at 120° C. The obtained material was pelleted, the pellets were crushed and 40-60 mesh fraction was isolated by sieving. The catalyst was sulphided and tested using the Diesel test procedure D2.

Reference Catalyst 2 (Ref 2: Ni1-W0.5-Mo0.5 R3 95° C.)

188 g of nickel hydroxycarbonate $2NiCO_3*3Ni(OH)_2*4H_2O$ (1.6 mole of Ni) were suspended in 8000 ml of water and the resulting slurry was heated to 60° C. Subsequently 115.2 of $MoO_3$ (0.8 mole Mo) and 200 g of tungstic acid $H_2WO_4$ (0.8 mole W) were added and the resulting slurry was heated to 95° C. and maintained at that temperature for a period of about 24 hours with continuous stirring. At the end of this time, the suspension was filtered. The obtained filter cake was wet-mixed with 10 wt % of a binder (based on the total weight of the catalyst composition). The water content of the mixture was adjusted in order to obtain an extrudable mix, and the mixture was subsequently extruded. The resulting solid was dried at 120° C. for 16 hours (overnight) and calcined at 300° C. for 1 hour. The extrudates were crushed and 40-60 mesh fraction was isolated by sieving. The material was then sulphided and tested using the Diesel test procedure D3.

Example VI

N1-W1 R3 90° C.

50.0 g of tungstic acid $H_2WO_4$ (0.2 mole W) was slurried in one liter of water together with 23.5 g of nickel hydroxycarbonate $2NiCO_3*3Ni(OH)_2*4H_2O$ (0.2 mole of Ni). The suspension of the 2 solids was heated to 90° C. and held at that temperature for a period of 20 hours (overnight) with continuous stirring. At the end of this time, the suspension was filtered. The resulting solid was dried at 120° C. for 16 hours (overnight). The resulting solid was pelleted, the pellets were crushed and 40-60 mesh and the fraction was isolated by sieving. The material was then calcined at 300° C. for 1 hour. The material was then sulphided and tested using the Diesel test procedure D3.

Example VII

Ni1-W1 R3 HT 125° C.

The catalyst was prepared under autogenic pressure in an autoclave reactor heated with microwave radiation at a reaction temperature of 125° C. and reaction time of about 6 hours. 2.35 g of Ni carbonate (0.02 moles Ni) was added to 100 cc of water along with 4.99 grams of tungstic acid (0.02 mole W). The suspension was put into a sealed Weflon™ vessel of 275 cc total volume and heated with microwave radiation at 10° C./min to 125° C. and held under autogenic pressure at that temperature for 6 hours with continuous stirring. The sample was cooled to room temperature and the solid filtered and dried overnight at 120° C. The obtained material was pelleted, the pellets were crushed and 40-60 mesh fraction was isolated by sieving. The material was then calcined at 300° C. for 1 hour. The material was then sulphided and tested using the Diesel test procedure D3.

Example VIII

Ni1-W1 R3 HT 90° C.

The catalyst was prepared under autogenic pressure in an autoclave reactor heated with microwave radiation at a reaction temperature of 150° C. and reaction time of about 6 hours. 2.35 g of Ni carbonate (0.02 moles Ni) was added to 100 cc of water along with 4.99 grams of tungstic acid (0.02 mole W). The suspension was put into a sealed Weflon™ vessel of 275 cc total volume and heated with microwave radiation at 110° C./min to 150° C. and held under autogenic pressure at that temperature for 6 hours with continuous stirring. The sample was cooled to room temperature and the solid filtered and dried overnight at 120° C. The obtained material was pelleted, the pellets were crushed and 40-60 mesh fraction was isolated by sieving. The material was then calcined at 300° C. for 1 hour. The material was then sulphided and tested using the Diesel test procedure D3.

Example IX

Ni1-W1 R3 HT 175° C.

The catalyst was prepared under autogenic pressure in an autoclave reactor heated with microwave radiation at a reaction temperature of 175° C. and reaction time of about 6 hours. 2.35 g of Ni carbonate (0.02 moles Ni) was added to 100 cc of water along with 4.99 grams of tungstic acid (0.02 mole W). The suspension was put into a sealed Weflon™ vessel of 275 cc total volume and heated at 110° C./min to 175° C. and held at that temperature for 6 hours with continuous stirring. The sample was cooled to room temperature and the solid filtered and dried overnight at 120° C. The obtained material was pelleted, the pellets were crushed and 40-60 mesh fraction was isolated by sieving. The material was then calcined at 300° C. for 1 hour. The material was then sulphided and tested using the Diesel test procedure D3.

Example X

Ni1-W 0.975-Nb 0.025 R3 90° C.

48.7 g of tungstic acid $H_2WO_4$ (0.195 mole W) was slurried in one liter of water together with 23.5 g of nickel hydroxycarbonate $2NiCO_3 \cdot 3Ni(OH)_2 \cdot 4H_2O$ (0.2 mole of Ni) and 0.8 grams of niobic acid (0.005 moles Nb). The suspension of the 3 solids was heated to 90° C. and held at that temperature for a period of 20 hours (overnight) with continuous stirring. At the end of this time, the suspension was filtered. The resulting solid was dried at 120° C. for 16 hours (overnight). The resulting solid was pelleted, the pellets were crushed and 40-60 mesh and the fraction was isolated by sieving. The material was then calcined at 300° C. for 1 hour. The material was then sulphided and tested using the Diesel test procedure D3.

Example XI

Ni1-W0.95-Nb 0.05 R3 90° C.

47.4 g of tungstic acid $H_2WO_4$ (0.19 mole W) was slurried in one liter of water together with 23.5 g of nickel hydroxycarbonate $2NiCO_3 \cdot 3Ni(OH)_2 \cdot 4H_2O$ (0.2 mole of Ni) and 1.6 grams of niobic acid (0.01 moles Nb). The suspension of the 3 solids was heated to 90° C. and held at that temperature for a period of 20 hours (overnight) with continuous stirring. At the end of this time, the suspension was filtered. The resulting solid was dried at 120° C. for 16 hours (overnight). The resulting solid was pelleted, the pellets were crushed and 40-60 mesh and the fraction was isolated by sieving. The material was then calcined at 300° C. for 1 hour. The material was then sulphided and tested using the Diesel test procedure D3.

Example XII

Ni1 W0.925 Nb 0.075 R3 90° C.

46.2 g of tungstic acid $H_2WO_4$ (0.185 mole W) was slurried in one liter of water together with 23.5 g of nickel hydroxycarbonate $2NiCO_3 \cdot 3Ni(OH)_2 \cdot 4H_2O$ (0.2 mole of Ni) and 2.4 grams of niobic acid (0.015 moles Nb). The suspension of the 3 solids was heated to 90° C. and held at that temperature for a period of 20 hours (overnight) with continuous stirring. At the end of this time, the suspension was filtered. The resulting solid was dried at 120° C. for 16 hours (overnight). The resulting solid was pelleted, the pellets were crushed and 40-60 mesh and the fraction was isolated by sieving. The material was then calcined at 300° C. for 1 hour. The material was then sulphided and tested using the Diesel test procedure D3.

Example XIII

Ni1 W0.975 Nb 0.025 HT 150° C.

The catalyst was prepared under autogenic pressure in an autoclave reactor heated with microwave radiation at a reaction temperature of 150° C. and reaction time of about 6 hours. 2.35 g of Ni carbonate (0.02 moles Ni) was added to 100 cc of water along with 4.87 grams of tungstic acid (0.0195 mole W) and 0.080 grams of niobic acid (0.0005 moles Nb). The suspension was put into a sealed Weflon™ vessel of 275 cc total volume and heated at 10° C./min to 150° C. and held at that temperature for 6 hours with continuous stirring. The sample was cooled to room temperature and the solid filtered and dried overnight at 120° C. The obtained material was pelleted, the pellets were crushed and 40-60 mesh fraction was isolated by sieving. The material was then calcined at 300° C. for 1 hour. The material was then sulphided and tested using the Diesel test procedure D3.

Example XIV

Ni1-W0.95 Nb 0.05 R3 HT 150° C.

The catalyst was prepared under autogenic pressure in an autoclave reactor heated with microwave radiation at a reaction temperature of 150° C. and reaction time of about 6 hours. 2.35 g of Ni carbonate (0.02 moles Ni) was added to 100 cc of water along with 4.74 grams of tungstic acid (0.019 mole W) and 0.16 grams of niobic acid (0.001 moles Nb). The suspension was put into a sealed Weflon™ vessel of 275 cc total volume and heated at 110° C./min to 150° C. and held at that temperature for 6 hours with continuous stirring. The sample was cooled to room temperature and the solid filtered and dried overnight at 120° C. The obtained material was pelleted, the pellets were crushed and 40-60 mesh fraction was isolated by sieving. The material was then calcined at 300° C. for 1 hour. The material was then sulphided and tested using the Diesel test procedure D3.

Example XV

Ni1-W0.925-Nb 0.075 R3 HT 150° C.

The catalyst was prepared under autogenic pressure in an autoclave reactor heated with microwave radiation at a reaction temperature of 150° C. and reaction time of about 6 hours. 2.35 g of Ni carbonate (0.02 moles Ni) was added to 100 cc of water along with 4.62 grams of tungstic acid (0.0185 mole W) and 0.24 grams of niobic acid (0.0015 moles Nb). The suspension was put into a sealed Weflon™ vessel of 275 cc total volume and heated at 10° C./min to 150° C. and held at that temperature for 6 hours with continuous stirring. The sample was cooled to room temperature and the solid filtered and dried overnight at 120° C. The obtained material was pelleted, the pellets were crushed and 40-60 mesh fraction was isolated by sieving. The material was then calcined at 300° C. for 1 hour. The material was then sulphided and tested using the Diesel test procedure D3.

Example XVI

Ni1-W1 R3 90° C. 7 Days 50.0 g of tungstic acid $H_2WO_4$ (0.2 mole W) was slurried in one liter of water together with 23.5 g of nickel hydroxycarbonate $2NiCO_3*3Ni(OH)_2*4H_2O$ (0.2 mole of Ni). The suspension of the 2 solids was heated to 90° C. and held at that temperature for a period of 7 days with continuous stirring. At the end of this time, the suspension was filtered. The resulting solid was dried at 120° C. for 16 hours (overnight). The resulting solid was pelleted, the pellets were crushed and 40-60 mesh and the fraction was isolated by sieving. The material was then calcined at 300° C. for 1 hour. The material was then sulphided and tested using the Diesel test procedure D3.

Example XVII

Ni 1.5-W1 R3 HT 150° C.

The catalyst was prepared under autogenic pressure in an autoclave reactor heated with microwave radiation at a reaction temperature of 150° C. and reaction time of about 6 hours. 3.53 g of Ni carbonate (0.03 moles Ni) was added to 100 cc of water along with 4.99 grams of tungstic acid (0.02 mole W). The suspension was put into a sealed Weflon™ vessel of 275 cc total volume and heated at 10° C./min to 150° C. and held at that temperature for 6 hours with continuous stirring. The sample was cooled to room temperature and the solid filtered and dried overnight at 120° C. The obtained material was pelleted, the pellets were crushed and 40-60 mesh fraction was isolated by sieving. The material was then calcined at 300° C. for 1 hour. The material was then sulphided and tested using the Diesel test procedure D3.

Example XVIII

Ni0.9-W1 R1 90° C.

49.2 g of ammonium metatungstate (0.2 mole W) were dissolved in 800 ml of water giving a solution of a pH of about 5.2. To this solution, 0.4 moles of ammonium hydroxide (ca. 30 ml) was added, resulting in a pH increase to about 9.8. This solution was heated to 90° C. (solution A). A second solution was prepared by dissolving 52.4 g Ni nitrate hexahydrate (0.18 mole Ni) in 50 ml of water. The solution was maintained at 90° C. (solution B). Solution B was added dropwise to solution A at a rate of 7 ml/min. The suspension that formed was stirred for 30 minutes while the temperature was maintained at 90° C. The material was filtered hot and dried in air at 120° C. overnight. The obtained material was pelleted, the pellets were crushed and 40-60 mesh fraction was isolated by sieving. The material was then calcined at 300° C. for 1 hour. The material was then sulphided and tested using the Diesel test procedure D3.

Example XIX

Ni0.9-W1 R1 HT 150° C.

The catalyst was prepared under autogenic pressure in an autoclave reactor heated with microwave radiation at a reaction temperature of 150° C. and reaction time of 30 minutes. To a solution of 10.48 g Ni nitrate hexahydrate (0.036 mole Ni) in 100 cc of water was added 9.86 g of ammonium metatungstate (0.04 mole W) and ca. 6 ml of ammonium hydroxide solution (0.08 mole $NH_4OH$). The suspension was put into a sealed Weflon™ vessel of 275 cc total volume and heated at 10° C./min to 150° C. and held at that temperature for 30 minutes with continuous stirring. The sample was cooled to room temperature and the solid filtered, washed and dried overnight at 120° C. The obtained material was pelleted, the pellets were crushed and 40-60 mesh fraction was isolated by sieving. The material was then calcined at 300° C. for 1 hour. The material was then sulphided and tested using the Diesel test procedure D3.

Example XX

Ni1-W1 R2 90° C.

49.2 g of ammonium metatungstate $(NH_4)_6H_2W_{12}O_{40}$ (0.2 mole W) were dissolved in 800 ml water, giving a solution with a pH of about 5.2 at room temperature. The solution was subsequently heated to 90° C. (solution A). 23.5 g of nickel hydroxycarbonate $2NiCO_3 \cdot 3Ni(OH)_2 \cdot 4H_2O$ (0.2 mole Ni) were suspended in 200 ml of water, and this suspension was heated to 90° C. (suspension B). Then suspension B was added to solution A in 10 minutes, and the resulting suspension was maintained at 90° C. for a period of 16 hours with continuous stirring. The resulting solid was dried at 120° C. for 16 hours (overnight). The resulting solid was pelleted, the pellets were crushed and 40-60 mesh fraction was isolated by sieving. The material was then sulphided and tested using the Diesel test procedure D3.

Example XXI

Ni1-W1 R2 HT 150° C.

The catalyst was prepared under autogenic pressure in an autoclave reactor heated with microwave radiation at a reaction temperature of 150° C. and reaction time of about 6 hours. 3.52 g of Ni carbonate (0.03 moles Ni) was added to 150 cc of water along with 7.40 g of ammonium metatungstate (0.03 mole W). The suspension was put into a sealed Weflon™ vessel of 275 cc total volume and heated with microwave radiation at 10° C./min to 150° C. and held under autogenic pressure at that temperature for 6 hours with continuous stirring. The sample was cooled to room temperature and the solid filtered and dried overnight at 120° C. The obtained material was pelleted, the pellets were crushed and 40-60 mesh fraction was isolated by sieving. The material was then calcined at 300° C. for 1 hour. The material was then sulphided and tested using the Diesel test procedure D3.

Diesel Test Procedure D1

The catalysts were tested in a down-flow tubular reactor. Each reactor tube contained 10 ml of catalyst mixed with an equal amount of SiC particles and sandwiched between layers of SiC particles. Before being tested, the catalysts were pre-sulfided via liquid phase presulfiding using the feed described in Table 1 which had been spiked with dimethyl disulfide to a total sulfur content of 3.7 wt. %. The presulfided catalysts were then tested in the hydrotreating of a diesel feedstock having the properties shown in Table 1.

TABLE 1

| GAS OIL FEEDSTOCK | |
|---|---|
| S (wt. %) | 1.2 |
| N (ppmwt) | 84 |
| total aromatics (wt. %) | 27.8 |
| polynuclear aromatic (PNA) (wt. %) | 11.7 |
| mono-aromatics (wt. %) | 16.5 |
| di-aromatics (wt. %) | 10.8 |
| Tri+-aromatics (wt. %) | 0.8 |
| Simulated distillation ASTM-D 86 | |
| Initial boiling point | 184° C. |
| 5 vol. % | 218° C. |

TABLE 1-continued

| 10 vol. % | 231° C. |
|---|---|
| 30 vol. % | 265° C. |
| 50 vol. % | 287° C. |
| 70 vol. % | 310° C. |
| 90 vol. % | 345° C. |
| Final boiling point | 374° C. |

The catalysts were tested under the two conditions shown in Table 2.

TABLE 2

| | Presulfiding | Condition 1 | Condition 2 |
|---|---|---|---|
| Temperature (° C.) | 320 | 330 | 340 |
| Pressure (bar) | 40 | 40 | 20 |
| H₂ to oil ratio (Nl/l) | 300 | 300 | 300 |
| LHSV (1/h) | 3.00 | 2.00 | 1.50 |

Diesel Test Procedure D2

The catalysts were tested as described in D1, except for another space velocity in the 1st condition, as illustrated in Table 3.

TABLE 3

| | Presulfiding | Condition 1 | Condition 2 |
|---|---|---|---|
| Temperature (° C.) | 320 | 330 | 340 |
| Pressure (bar) | 40 | 40 | 20 |
| H₂ to oil ratio (Nl/l) | 300 | 300 | 300 |
| LHSV (1/h) | 3.00 | 1.50 | 1.50 |

Diesel Test Procedure D3

The catalyst was loaded into the reactor in a manner analogous to what is described in D1. Before being tested the catalysts were presulphided via liquid phase presulphiding using LGO feed described below in Table 4 which had been spiked with dimethyl disulfide to a total sulfur content of 3.7 wt. %. The presulphided catalysts were then tested in the hydrotreating of a diesel feedstock having the properties shown in Table 4:

TABLE 4

| GAS OIL FEEDSTOCK | |
|---|---|
| S (wt. %) | 1.1969 |
| N (ppmwt) | 102 |
| total aromatics (wt. %) | 28.3 |
| mono-aromatics (wt. %) | 16.5 |
| di-aromatics (wt. %) | 11.0 |
| Tri+-aromatics (wt. %) | 0.8 |
| Simulated distillation ASTM-D 86 | |
| Initial boiling point | 178.4° C. |
| 5 vol. % | 211° C. |
| 10 vol. % | 224° C. |
| 30 vol. % | 261° C. |
| 50 vol. % | 283° C. |
| 70 vol. % | 309° C. |
| 90 vol. % | 348° C. |
| Final boiling point | 372° C. |

The catalysts were tested under the two conditions shown in Table 5:

TABLE 5

|  | Presulfiding | Condition 1 | Condition 2 |
|---|---|---|---|
| Temperature (° C.) | 320 | 320 | 340 |
| Pressure (bar) | 45 | 45 | 20 |
| H2 to oil ratio (Nl/l) | 200 | 300 | 300 |
| LHSV (1/h) | 3.00 | 3.00 | 1.50 |

TABLE 6

TEST RESULTS

| Sample | Synthesis conditions | test powder | test extrudates | CBD loaded | S1 ppm | S2 ppm | N2 ppm | RVA HDS1 | RVA HDS2 | RWA HDS1 | RWA HDS2 | RVA HDN2 | RWA HDN2 |
|---|---|---|---|---|---|---|---|---|---|---|---|---|---|
| R1 | Ni1Mo0.5W0.5 R3 90 crushed | D1 |  | 1.21 | 4 | 21 | 5 | 100 | 100 | 100 | 100 | 100 | 100 |
| I | Ni0.75W1 R3 HT 150 | D1 |  | 1.63 | 3 | 13 | 3 | 114 | 126 | 85 | 93 | 115 | 86 |
| II | Ni1W1 R3 HT 150 | D1 |  | 1.73 | 3 | 8 | 2 | 113 | 155 | 79 | 108 | 130 | 91 |
| III | NiMo0.5W0.5 R3 HT 150 | D1 |  | 1.27 | 3 | 20 | 3 | 110 | 103 | 105 | 98 | 111 | 106 |
| R1 | Ni1Mo0.5W0.5 R3 90 |  | D2 | 1.17 | 9 | 75 | 12 | 100 | 100 | 100 | 100 | 100 | 100 |
| IV | Ni0.5W1 R3 HT 150 |  | D2 | 1.09 | 9 | 93 | 17 | 90 | 78 | 100 | 87 | 75 | 82 |
| V | Ni0.5W0.975Nb0.025 R3 HT 150 |  | D2 | 1.23 | 4 | 69 | 13 | 121 | 90 | 119 | 89 | 84 | 83 |
| R2 | Ni1Mo0.5W0.5 R3 95 |  | D3 | 1.25 | 149 | 23 | 3.7 | 100 | 100 | 100 | 100 | 100 | 100 |
| VI | Ni1W1 R3 90 |  | D3 | 1.12 | 1591 | 206 | 29 | 26 | 36 | 31 | 44 | 38 | 46 |
| VII | Ni1W1 R3 HT125 |  | D3 | 1.64 | 16 | 9 | 1.3 | 279 | 147 | 216 | 114 | 125 | 97 |
| VIII | Ni1W1 R3 HT150 |  | D3 | 1.72 | 9 | 9 | 1.4 | 347 | 151 | 259 | 113 | 130 | 97 |
| IX | Ni1W1 R3 HT175 |  | D3 | 1.75 | 6 | 8 | 1.2 | 420 | 150 | 311 | 111 | 127 | 94 |
| X | Ni1Nb0.025W0.975 R3 90 |  | D3 | 1.05 | 1256 | 148 | 21 | 31 | 42 | 36 | 50 | 47 | 56 |
| XI | Ni1Nb0.05W0.95 R3 90 |  | D3 | 1.16 | 679 | 50 | 9 | 45 | 70 | 51 | 80 | 72 | 82 |
| XII | Ni1Nb0.075W0.925 R3 90 |  | D3 | 1.12 | 884 | 74 | 13 | 38 | 59 | 44 | 68 | 62 | 72 |
| XIII | Ni1Nb0.025W0.975 R3 HT150 |  | D3 | 1.67 | 5 | 9 | 1.4 | 456 | 149 | 363 | 118 | 129 | 103 |
| XIV | Ni1Nb0.05W0.95 R3 HT150 |  | D3 | 1.63 | 5 | 9 | 1.5 | 455 | 149 | 365 | 119 | 128 | 102 |
| XV | Ni1Nb0.075W0.925 R3 HT150 |  | D3 | 1.72 | 9 | 11 | 1.3 | 346 | 137 | 270 | 106 | 133 | 103 |
| XVI | Ni1W1 R3 90 7 days |  | D3 | 1.51 | 67 | 17 | 2.9 | 148 | 112 | 124 | 93 | 102 | 85 |
| XVII | Ni1.5W1 R3 HT150 |  | D3 | 1.63 | 64 | 20 | 3.7 | 148 | 107 | 115 | 83 | 100 | 77 |
| XVIII | Ni0.9W1 R1 90 |  | D3 | 2.5 | 851 | 86 | 8.1 | 40 | 54 | 21 | 28 | 73 | 38 |
| XIX | Ni0.9W1 R1 HT 150 |  | D3 | 1.92 | 15 | 14 | 2.3 | 287 | 119 | 192 | 79 | 109 | 73 |
| XX | Ni1W1 R2 90 |  | D3 | 1.79 | 422 | 51 | 6.9 | 60 | 68 | 41 | 47 | 78 | 54 |
| XXI | Ni1W1 R2 HT 150 |  | D3 | 1.6 | 110 | 23 | 3.3 | 118 | 97 | 94 | 77 | 99 | 79 |

The results obtained under test conditions D1 show that hydrothermal synthesis conditions allow the preparation of a catalyst with better activity than atmospheric synthesis conditions. These results also show that hydrothermal synthesis conditions allow the preparation of active catalysts having a Group VIII to Group VIB metal mole ratio of 1 or less. The results obtained under test conditions D2 show that hydrothermal synthesis conditions allow the preparation of catalysts with acceptable activity with Group VIII to Group VIB metal mole ratios as low as 0.5. The results obtained under conditions D3 show that hydrothermal conditions allow the preparation of very active nickel tungsten catalysts from a synthesis mixture containing nickel and tungsten at a molar ratio of about 1. The catalysts obtained under hydrothermal synthesis conditions are more active than catalysts obtained under atmospheric conditions from synthesis mixtures having the same nickel/tungsten molar ratio.

What is claimed is:

1. A process for hydroprocessing a hydrocarbon feed, the process comprising contacting the feed with hydrogen in the presence of a catalytically effective amount of a bulk metal catalyst under catalytic conversion conditions to form a hydroprocessed product, the bulk metal catalyst comprising metal oxidic particles containing niobium as a Group V metal, only one Group VIB metal, and only one Group VIII metals, the bulk metal catalyst being made by:

(i) combining in a reaction mixture one or more first compounds comprising only one Group VIII metal, one or more second compounds comprising only one Group VIB metal, and one or more third compounds comprising niobium as a Group V metal in the presence of a protic liquid, wherein the Group VIII metal to Group VIB metal molar ratio is between about 0.1 and about 1.5, and wherein the Group V metal content is at least about 0.1 mol % and less than about 10 mol %; and (ii) reacting the compounds under hydrothermal conditions to form metal oxidic particles, wherein a corresponding atmospheric product is obtained under identical process conditions using a corresponding atmospheric bulk metal catalyst having identical ingredients and an identical method of manufacture as the bulk metal catalyst except that the compounds were reacted at atmospheric conditions instead of hydrothermal conditions, and wherein the hydroprocessed product has (a) a lower sulfur content than the corresponding atmospheric product, due to the bulk metal catalyst having an increased hydrodesulfurization activity compared to the corresponding atmospheric bulk metal catalyst, (b) a lower nitrogen content than the corresponding atmospheric product, due to the bulk metal catalyst having an increased hydrodenitrogenation activity compared to the corresponding atmospheric bulk metal catalyst, or (c) both (a) and (b).

2. The process of claim 1, wherein the hydrothermal conditions include heating the reaction mixture at a temperature above the atmospheric boiling point of the protic liquid.

3. The process of claim 1, wherein the hydrothermal conditions include heating the reaction mixture in a sealed reaction vessel.

4. The process of claim 1, wherein the protic liquid is water and the reaction is done under hydrothermal conditions at a reaction temperature above about 100° C. and under autogenic pressure in a sealed vessel.

5. The process of claim 1, wherein the Group VIII metal to Group VIB metal mole ratio is between about 0.2 and about 1.0.

6. The process of any of claim 1, wherein the one or more first metal compounds and the one or more second metal compounds remain at least partly in the solid state during the entire reaction.

7. The process of claim 1, wherein the metal oxidic particles are dried and/or heat treated at a temperature below about 375° C.

8. The process of claim 1, wherein the metal oxidic particles comprise nickel as the only one Group VIII metal and tungsten as the only one Group VIB metal.

9. The process of claim 1, further comprising the step of treating the bulk metal catalyst with a sulfur-containing compound.

10. The process of claim 1, further comprising the step of combining the metal oxidic particles with one or several binding materials so that the bulk metal catalyst comprises at least about 60 wt % metal oxidic particles.

11. A process for hydroprocessing a hydrocarbon feed, the process comprising contacting the feed with hydrogen in the presence of a catalytically effective amount of a bulk metal catalyst under catalytic conversion conditions to form a hydroprocessed product, the bulk metal catalyst comprising metal oxidic particles containing at least about 0.1 mol % and less than about 10 mol % of a Group V metal, only tungsten as Group VIB metal, and only nickel as Group VIII metal, and the mole ratio of nickel to tungsten is between about 0.2 and about 1.5, wherein a corresponding atmospheric product is obtained under identical process conditions using a corresponding atmospheric bulk metal catalyst having identical ingredients and an identical method of manufacture as the bulk metal catalyst except that the compounds were reacted at atmospheric conditions instead of hydrothermal conditions, and wherein the hydroprocessed product has (a) a lower sulfur content than the corresponding atmospheric product, due to the bulk metal catalyst having an increased hydrodesulfurization activity compared to the corresponding atmospheric bulk metal catalyst, (b) a lower nitrogen content than the corresponding atmospheric product, due to the bulk metal catalyst having an increased hydrodenitrogenation activity compared to the corresponding atmospheric bulk metal catalyst, or (c) both (a) and (b).

12. The process of claim 11, wherein the mole ratio of nickel to tungsten is between about 0.2 and about 1.0.

13. The process of claim 1, further comprising forming a product containing hydrocarbon and at least one of sulfur and nitrogen, and then separating the hydrocarbon product.

14. The process of claim 13, wherein the hydrocarbon feed contains organically-bound sulfur and organically-bound nitrogen, and wherein the catalytic conversion conditions are hydrotreating conditions effective for converting at least a portion of organically-bound sulfur and organically-bound nitrogen in the feed to hydrogen sulfide and ammonia respectively.

15. The process of claim 14, wherein the catalytic conversion conditions comprise at least one of (i) hydrocracking and (ii) hydrogenating the hydrocarbon feed.

16. The process of any of claim 13, wherein the separated hydrocarbon product is used neat or blended to make at least one of (i) a fuel oil, (ii) a diesel oil, (iii) a lubricating oil, or (iv) a lubricating oil basestock.

* * * * *